No. 711,125. Patented Oct. 14, 1902.
C. F. RICHTER.
GRASS OR GRAIN MOWING MACHINE.
(Application filed Mar. 17, 1902.)
(No Model.)
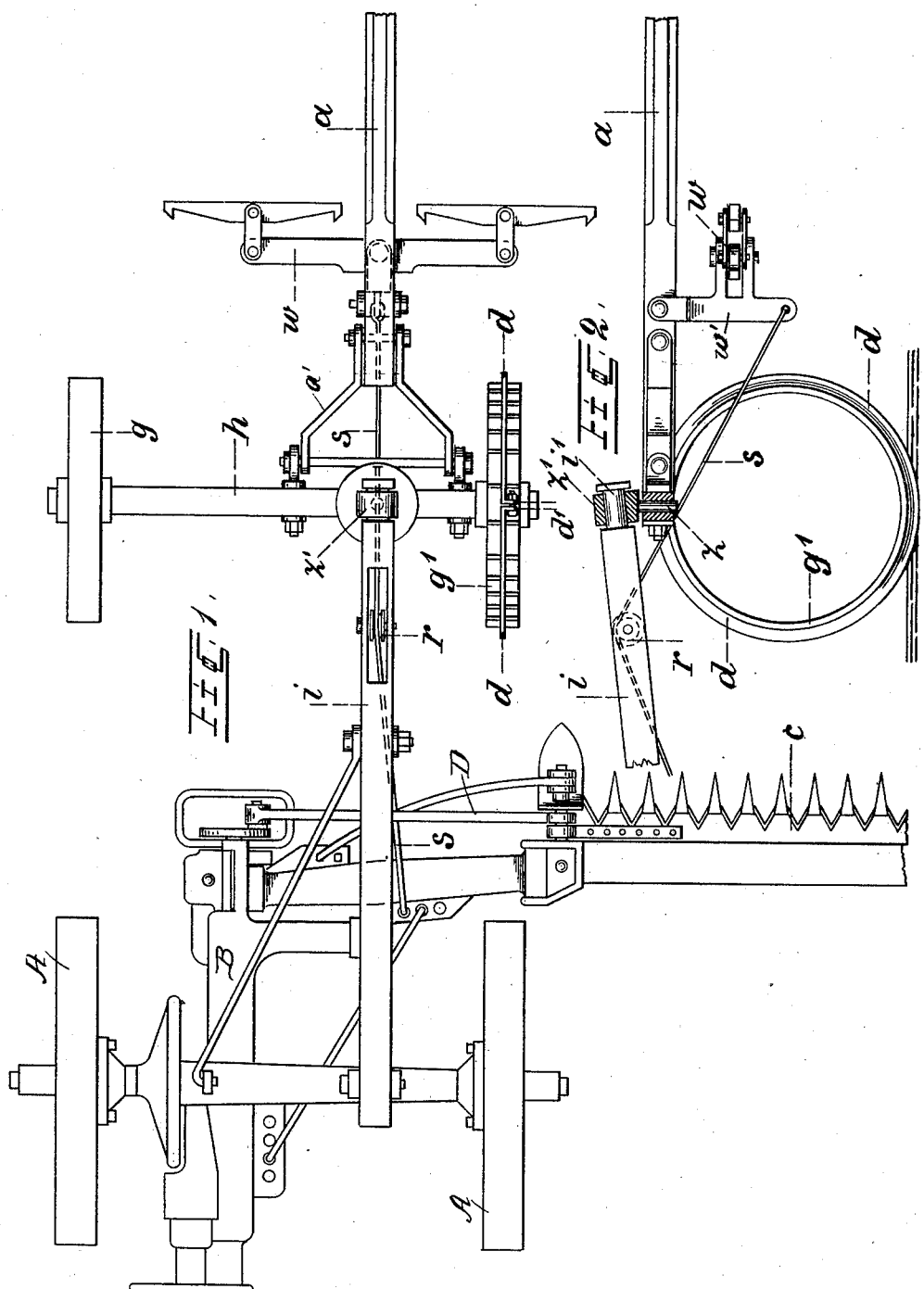

United States Patent Office.

CHRISTIAN FRIEDRICH RICHTER, OF BRANDENBURG-ON-THE-HAVEL, GERMANY.

GRASS OR GRAIN MOWING MACHINE.

SPECIFICATION forming part of Letters Patent No. 711,125, dated October 14, 1902.

Application filed March 17, 1902. Serial No. 98,471. (No model.)

*To all whom it may concern:*

Be it known that I, CHRISTIAN FRIEDRICH RICHTER, manufacturer, a subject of the King of Prussia, German Emperor, residing at and whose post-office address is Brandenburg-on-the-Havel, in the Kingdom of Prussia, German Empire, have invented certain new and useful Improvements in Grass or Grain Mowing Machines, of which the following is a specification.

My invention has for its object to provide improved means for transmitting the pull of the traction-animal to the mower-frame and also to provide improved means to reduce to the minimum deviation from the direction of movement of the mower while in operation.

To the accomplishment of the foregoing and such other objects as may hereinafter appear the invention consists in the construction and combination of parts hereinafter particularly described and then sought to be clearly defined by the claims, reference being had to the accompanying drawings, forming a part hereof, and in which—

Figure 1 is a top plan view of a mower embodying my invention, and Fig. 2 a side view of the front frame or truck with parts broken away and other parts in section.

In the drawings the letter A designates the wheels, B the frame, c the cutter-bar, and D a pitman-rod connected to the cutter-bar, all of which may be of any approved pattern or construction, and from the forward portion of the mower-frame there extends a beam $i$, which may be said to constitute a part of the mower-frame.

In front of the mower-frame there is provided a wheeled frame or truck consisting of wheels $g$ and $g'$, connected together by an axle $h$ and a tongue or pole-beam $a$, suitably hinged to the truck-axle by an iron $a'$ or otherwise. The truck is connected to the beam $i$ of the mower-frame by a universal joint, which in the drawings is illustrated as consisting of a collar $z'$, fitted to turn on a stud $i'$, projecting from the end of the beam $i$, the collar being provided with a depending pin $z$, which passes through a suitable part of the truck-frame, as illustrated, so as to permit the frame to turn in a horizontal plane about the pin $z$, the connection of the frame to the beam $i$ by the collar or ring $z'$ permitting the truck-frame to turn or move in a vertical plane. This construction permits the truck-frame to adjust itself to any inequalities in the ground without transmitting such movement to or affecting the movement of the mower-frame. It also relieves the traction-animals of strain which otherwise exists by reason of inequalities in the ground over which the mower is drawn.

From the pole-beam $a$ there depends a pivoted lever $w'$, to which the whiffletree $w$ for the draft-animals is connected, and the lower end of this lever is connected by a chain or cable $s$ to the mower-frame, said cable passing over a roller $r$, journaled in the beam $i$, and its end is connected to the mower-frame at one side of the beam $i$ and in the direction of the cutter-bar $c$. By this construction the pull of the draft-animals is direct from the mower-frame by means of a flexible connection, such as a cable or chain, which, in connection with the universal joint between the pole-beam and the beam extending from the mower-frame, will prevent any side motion occasioned by staggering of the draft-animals from being transmitted to the mower-frame, and consequently the mower will move more evenly and regularly than otherwise, and thus effect a more satisfactory cutting of the grass or grain, and unnecessary strain upon the draft-horses will be prevented, as before indicated. These two features combined will under ordinary conditions cause the wheel $g'$ of the truck-frame to enter more deeply or take a stronger grip upon the ground by reason of the greatest resistance being from the side of the machine from which extends the cutter-bar $c$ and to which side of the frame the cable $s$ is connected; but if the ground be very hard, so that the wheel $g'$ cannot take a firm grip by being depressed into the ground under the strain mentioned, there will be a tendency of the truck-frame to slide sidewise. To guard against this the wheel $g'$ is provided with a flange or ring $d$, which is passed around the rim or tire of the wheel and clamped thereto by means of a bolt passed through the lugs or lateral flanges $d'$, formed as a part of the ring. This ring or flange will cut into the ground and take a firm hold thereon and prevent the side slipping mentioned. When the machine is to be moved from one field to another, the flange $d$ is removed from the wheel, so that the machine can be driven over the roads without damaging or injuring this detachable flange or grip-ring.

Having described my invention and set forth its merits, what I claim is—

1. In a mowing-machine, the combination with the mower-frame, of a truck-frame in front thereof, a universal-joint connection between the truck-frame and the mower-frame, a pole-beam connected to the truck-frame, a draft-lever pivoted to the pole-beam, and a flexible draft connection between the draft-lever and the mower-frame, substantially as described.

2. In a mowing-machine, the combination with the mower-frame, having a beam extending from the front thereof, of a wheeled truck in front of the mower-frame, a universal-joint connection between the frame of the wheeled truck and the beam of the mower-frame, a pole-beam to the wheeled truck, a draft-lever pivoted to the pole-beam, a draft-cable connecting the draft-lever and the mower, and extending along the mower-frame beam, and means connected to said beam for guiding the draft-cable, substantially as described.

3. In a mowing-machine, the combination with the mower-frame, of a wheeled truck in front of the mower-frame and loosely connected with a part thereof, a draft-lever, a pole-beam to the wheeled truck from which the draft-lever is pivotally suspended, a flexible draft-cable connecting the draft-lever with the mower on the side of the frame toward the cutter-bar, and a roller supported by a part of the mower-frame and over which the flexible draft-cable passes, substantially as described.

4. In a mowing-machine, the combination with the mower-frame and its cutter-bar, of a wheeled truck in front of the mower-frame and having a universal-joint connection with a part thereof, a pole-beam extending from the wheeled truck, a draft-lever pivotally suspended from the pole-beam, a flexible draft-cable connecting the draft-lever with the mower, and a detachable grip-flange secured to the rim of one of the wheels of the truck on the side of the truck toward the cutter-bar of the mower-frame, the other wheel of the truck having no grip-flange, substantially as described.

In witness whereof I have hereunto set my hand in presence of two witnesses.

CHRISTIAN FRIEDRICH RICHTER.

Witnesses:
HENRY HASPER,
WOLDEMAR HAUPT.